May 19, 1942.
A. T. COLWELL ET AL
2,283,424
CYLINDER LINER SLEEVE
Filed March 20, 1939
2 Sheets-Sheet 1
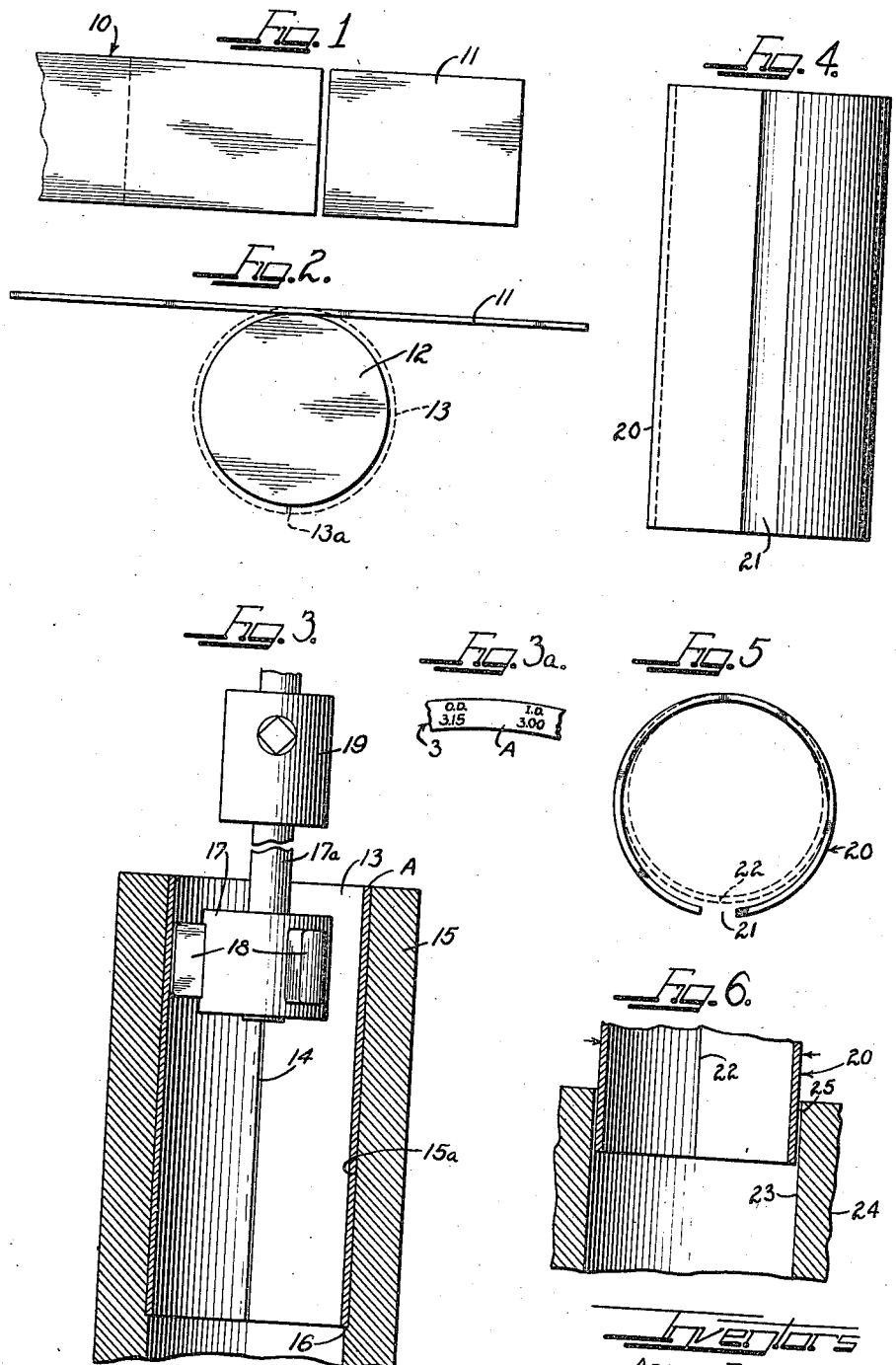
Inventors
ARCHIE T. COLWELL
HERBERT H. ENGEMANN May 19, 1942.  A. T. COLWELL ET AL  2,283,424
CYLINDER LINER SLEEVE
Filed March 20, 1939   2 Sheets-Sheet 2
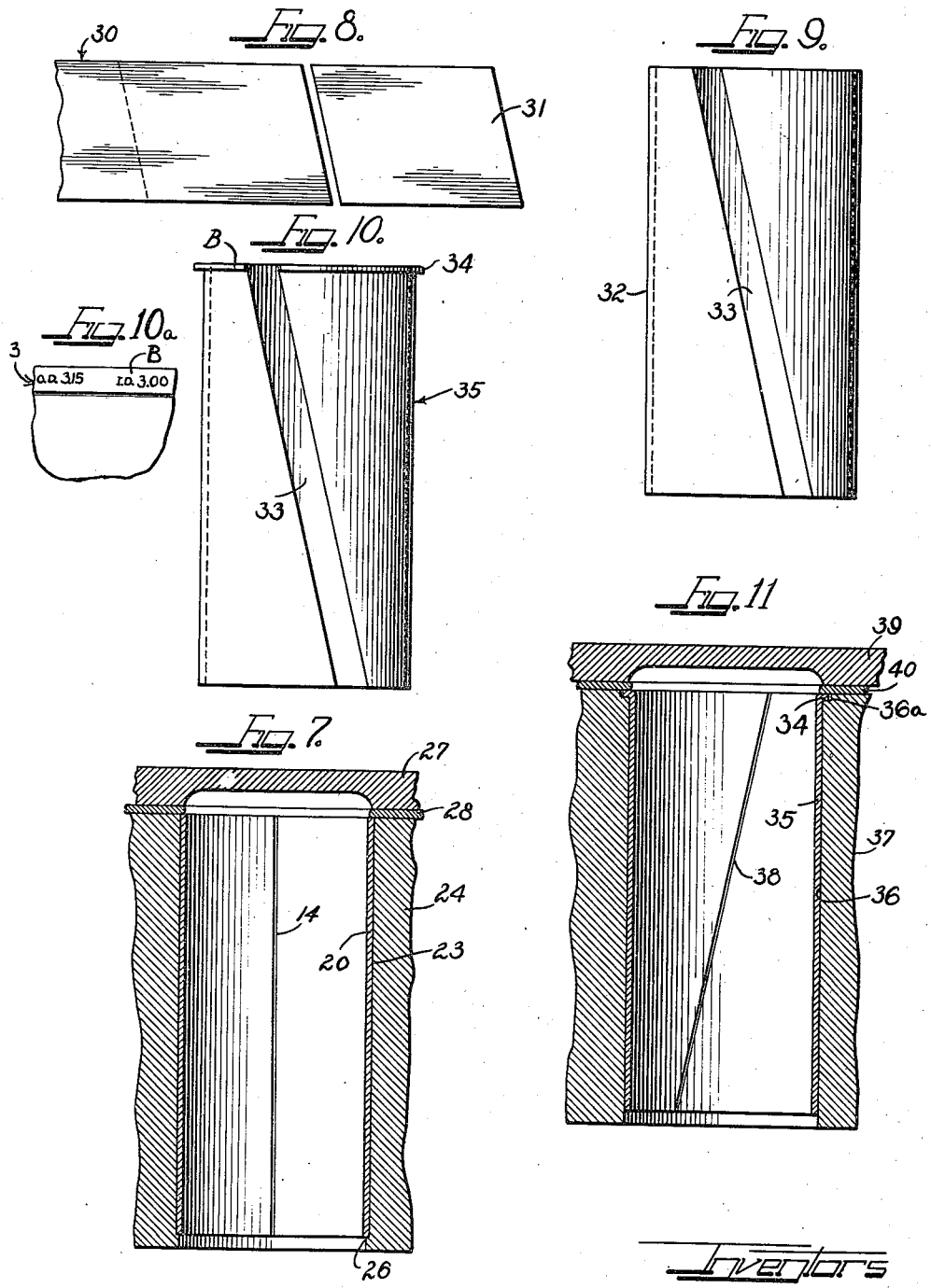
Inventors
ARCHIE T. COLWELL
HERBERT H. ENGEMANN Patented May 19, 1942

2,283,424

UNITED STATES PATENT OFFICE 2,283,424

CYLINDER LINER SLEEVE

Archie T. Colwell and Herbert H. Engemann, Cleveland, Ohio, assignors to Thompson Products Incorporated, Cleveland, Ohio, a corporation of Ohio Application March 20, 1939, Serial No. 262,918

5 Claims. (Cl. 309—3)

This invention relates to cleft or split liners for engine cylinders, tappets, valve stems, shafts, bearings and the like.

More specifically the invention relates to split metal liner sleeves adapted to be contracted to a size less than the desired size without overlapping the adjoining edges thereof so as to facilitate insertion in a member to be lined thereby and exerting, in its contracted state, an expanding force tending to reclaim its original size.

The liners of this invention will hereinafter be specifically described in connected with liner sleeves for engine cylinders, but it should be understood that the invention is not limited to such use.

The known split liner sleeves are formed for press-fitting into a cylinder so that they will lay firmly against the wall of the cylinder. The press fit is depended upon to provide the force to lay the split liner firmly against the cylinder wall and the liner is therefore placed in a stressed condition. Furthermore the press fit will tend to distort the cylinder because of tension forces set up in the walls defining the cylinder.

Special tools are required for installation and for removal of the press fit type split liners and great care must be taken so that the mating edges of the liners come together in exact alignment as they enter the cylinder.

Close manufacturing limits are required to obtain an accurate press fit and, even if such limits are rigorously adhered to, a honing or polishing operation is required after the liner has been press-fitted into the cylinder for removal of remaining defects caused by distortion and the inability of the press fit to effect a complete conformity between the liner and the cylinder.

According to this invention, press fits are entirely dispensed with by accurate preforming of a resilient cleft liner sleeve having a greater outside diameter in its free state than the diameter of the cylinder to be lined therewith. The liners of this invention are resilient or springy and, in their free state, are non-circular and have an appreciable cleft gap. This gap is adapted to be closed by contraction of the liner sleeve to decrease the outside of the sleeve to a diameter less than the diameter of the cylinder to be lined therewith without, however, overlapping the gap-defining edges of the sleeve. In its contracted state, the sleeve exerts an expanding force tending to reclaim the original cleft gap and, in this fully contracted state, the sleeve is readily insertable to the cylinder.

The free insertion of the completely contracted liner sleeve avoids the necessity for any special insertion and removing tools. The seated liner in the cylinder has a diameter slightly greater than the diameter assumed in its fully contracted condition. The seated liner has a very small cleft gap when seated in the cylinder whereas the press fitted liner sleeve must have the adjoining edges thereof in tight, abutting relation.

The very small gaps in the seated liner sleeves of this invention vary within appreciable limits without affecting the cylindrical roundness of the new liner and the liners of this invention are therefore less costly to manufacture than the conventional split liners, wherein the circumferential dimensions had to be held within small limits.

The liners of this invention are formed by bending a flat metal sheet into a resilient, cylindrically shaped body member having a comparatively wide cleft gap throughout its length. The body member is then inserted in a fixture having the same diameter as the cylinder to be lined therewith. The liner in the fixture is honed to a uniform inside diameter of the desired size. The cylindrical body member may be heat-treated prior to honing if desired.

It is, then, an object of this invention to provide a split liner contractible to a size less than operating size for free insertion into a cylinder and exerting an expanding force in its contracted state.

A further object of the invention is to provide an elongated liner sleeve having a cleft gap throughout its length and adapted to be resiliently contracted to vary the size of the gap without overlapping the gap defining edges.

A further object of the invention is to provide a split liner sleeve for engine cylinders which is freely insertable into a cylinder without special tools.

Another object of the invention is to increase the manufacturing tolerance required for split liner sleeves by providing an expansible and contractible resilient liner having a cleft gap throughout its length.

Another object of the invention is to eliminate heretofore required sizing of liner sleeves after the same have been seated in operating position.

A further object of the invention is to provide a method of making resiliently expansible cleft liners, which method avoids the necessity for honing the liners after the same have been seated in operating position.

Other and further objects of the invention will become apparent to those skilled in the art from the following detailed description of the annexed sheets of drawings which disclose preferred embodiments of the invention.

On the drawings:

Figure 1 is a top plan view of flat metal sheets from which the liners of this invention are formed.

Figure 2 is an end elevational view illustrating the forming of a cylindrical body member from a flat sheet shown in Figure 1.

Figure 3 is a vertical cross-sectional view of the cylindrical body member shown in Figure 2 seated in a honing fixture and also showing a honing tool in elevation.

Figure 3a is a fragmentary view of an edge of the cylindrical body member having identifying indicia thereon.

Figure 4 is a side elevational view of a cleft liner sleeve according to this invention.

Figure 5 is an end elevational view of the liner sleeve shown in Figure 4 illustrating, in dotted lines, the form of the sleeve in a fully contracted state.

Figure 6 is a vertical cross-sectional view of a liner sleeve and engine block illustrating the method of inserting the liner in the cylindrical bore of the block.

Figure 7 is a vertical cross-sectional view of an engine block and liner sleeve showing the sleeve seated in operative position in the cylindrical bore of the block.

Figure 8 is a top plan view of flat metal sheets for forming a modified liner sleeve according to this invention.

Figure 9 is a side elevational view of a cylindrical body member formed from a sheet shown in Figure 8.

Figure 10 is a side elevational view of a liner sleeve formed from the body member shown in Figure 9.

Figure 10a is an enlarged fragmentary side elevational view of the liner sleeve shown in Figure 10, illustrating identifying indicia on the sleeve.

Figure 11 is a vertical cross-sectional view illustrating the liner sleeve of Figure 10 seated in operative position in an engine cylinder.

As shown on the drawings:

In Figure 1 the reference numeral 10 designates a strip of metal from which rectangular sheets 11 are cut. The sheet 11 is cut to proper dimensions so that when the same is bent around a cylindrical mandrel 12 as shown in Figure 2, a cylindrical body member 13 of the desired size is formed. The body member 13 preferably has the ends thereof in substantially abutting relation as shown at 13a.

The resulting cylindrical body member 13 is springy and, when removed from the mandrel 12, will open up a gap between the adjoining edges 13a. The cylindrical member in its free state does not define a true circular cylinder but will assume a true circular cylindrical form when contracted to bring the edges thereof into substantially abutting relation.

The body member 13 can be formed from any suitable metal such as steel, Nitralloy, or the like, and, for economy reasons, is of relatively thin gauge. However, heavy gauge material can be used if desired.

After the bending operation the body member 13 can be heat-treated. A nitriding treatment can be used to harden the steel.

The body member 13 is then inserted in the cylindrical bore 15a of a fixture 15. The bore 15a has the same diameter as a cylinder to be lined by the body member. The bore 15a is somewhat larger than the outside diameter of the body member 13 when the body member is in its fully contracted position so that a gap 14 is formed throughout the length of the body member after it is seated in the fixture. This gap 14 preferably is of a small width but is desirable to permit free removal and entry of the body member in the fixture.

The fixture 15 has a shoulder 16 in spaced relation from the top thereof for supporting the body member 13 therein.

A honing tool 17 is suspended on a shaft 17a in the body member 13. The honing tool 17 has a plurality of honing stones 18 or other cutting or grinding means thereon and is rotated by means of a chuck 19.

The inside surface of the body member 13 is honed until it has a rigorously uniform desired diameter.

As shown in Figure 3a, an end A of the body member 13 can be marked with the outside and inside diameter dimensions of the member when it is contracted to a true circular cylindrical form as in the fixture 15. Thus the end A can indicate that the outside diameter or O. D. of the contracted body member is 3.15 inches while the inside diameter or I. D. of the body member is 3.00 inches.

After the honing operation the body member 13 is removed from the fixture 15 to form the finished liner 20 shown in Figures 4 and 5. As shown, the liner 20 has a wide cleft gap 21 throughout its length when it is in its free or uncontracted state.

As best shown in Figure 5, the free liner 20, illustrated in solid lines, can be fully contracted as shown in dotted lines and the gap 21 will be closed as shown at 22.

In Figure 6 there is illustrated a method of inserting the liner sleeve 20 into the bore 23 of an engine block 24. As shown in Figure 6, the sleeve 20 is contracted to bring the gap defining edges into abutting position as shown at 22. In this fully contracted state, the liner 20 is of smaller diameter than the diameter of the bore 23 so that a small clearance 25, which is exaggerated on the drawings, is provided between the outside of the liner and the walls defining the bore 23.

The liner 20 can be contracted to provide this small clearance 25 by means of a clamping ring or by hand, if desired. This permits a free insertion of the liner into the bore of the cylinder block 24.

As shown in Figure 7, the fully seated liner 20 in the cylinder block 24 expands outwardly from its fully contracted state to reclaim the original gap 14 formed in the fixture 15. This gap 14 is of materially less width than the gap 21 of the free liner as shown in Figures 4 and 5 so that the liner will exert an expanding force against the walls of the bore 23.

The bore 23 preferably has a shoulder 26 therein supporting the bottom of the liner 20. A head 27 is clamped on the cylinder block 24 and a gasket 28 is interposed between the head and the cylinder block.

The seated liner 20 in the bore 23 has the same identical dimensions as are stamped at A on the body member in the fixture. Thus, while the liner in its free state or in its fully contracted state is of a materially different size from the size indicated thereon, the indicated size is assumed when the liner is seated for operation. The honing operation in the fixture has provided a rigorously uniform inner circular wall of the desired diameter and the seated liner does not need to be further honed or otherwise machined.

The small gap 14 can vary through an appreciable range to correct any irregularities in the bore 23 and, since the liner does not have a press fit in the bore, it will not distort from its true circular cylindrical shape. The gap 14 is preferably maintained at a minimum but must be sufficient to avoid a press fit in the bore 23.

As shown in Figure 8, the reference numeral 30 designates a strip of metal from which flat metal sheets such as 31 are cut. These flat metal sheets have sloping side edges so that when the same are bent around a cylindrical mandrel to form the cylindrical body member 32 shown in Figure 9, this body member will have a slanting cleft gap 33.

As shown in Figure 10, an outturned flange or collar 34 is formed on one end of the body member 32. The flanged body member can be heat-treated if desired and is then inserted in a fixture such as 15 for the honing operation to form the finished liner sleeve 35.

A portion B of the collar or flange 34 can be marked with size indicating data as shown in Figure 10a.

The liner 35 is inserted in the bore 36 of an engine block 37 as shown in Figure 11 while the collar 34 is seated in a counterbore 36a of the bore 36.

In its seated position, the liner sleeve 35 has a helical cleft gap 38 throughout its length of less width than the gap 33 so that the liner will exert an expanding force tending to reclaim the gap 33. The gap 38 is maintained at a minimum consistent with a free insertion of the liner in the bore 36 without overlapping the gap-defining edges. Thus the liner can be contracted by hand or by a clamping ring to fully close the gap 33 when inserting the liner into the bore 36. This permits an easy insertion of the liner into its seating position.

The flange 34 is clamped between the cylinder head 39 and the cylinder block 37 as shown in Figure 11. A gasket 40 is compressed between the block and head.

From the above description it should be understood that this invention provides cleft or split liners that do not assume a true circular cylindrical form in their free state but are contractible into a perfect circular cylinder when seated in a prepared hole or bore for which they are intended. In their seated position, the liners of this invention have a minimum gap between their adjoining edges but this gap is sufficient to permit a further contraction of the liner for facilitating entry and removal of the liner from the bore or hole. Press fits, with their attendant disadvantages, are entirely dispensed with.

The liner sleeves of this invention are stamped with size identifying data indicating the outside diameter and the inside diameter of the sleeves when seated in proper operating condition. The sleeves in their free state do not have the size indicated thereon.

It will, of course, be understood that various details of the process and article may be varied through a wide range without departing from the principles of this invention and it is, therefore, not the purpose to limit the patent granted hereon otherwise than necessitated by the scope of the appended claims.

We claim as our invention:

1. A liner sleeve comprising an elongated non-circular cylindrically shaped resilient metal body member having a radially open straight cleft gap throughout its length, said body member being resiliently contractible into a true circular cylinder having a radially open straight cleft gap throughout its length of less width than the original gap.

2. An elongated liner sleeve for engine cylinders comprising a cylindrically shaped thin walled body member formed of hardened resilient sheet metal of uniform thickness and having a straight open cleft gap throughout its length formed by the spaced faces on adjacent edges of said sheet metal, the circumferential length of the body member being less than the circumference of a selected engine cylinder to be lined therewith, said body member being contractible to a diameter smaller than the diameter of the selected cylinder when the faces of said sheet metal edges forming the cleft are in abutment whereby the contracted liner can be freely inserted in a cylinder, and said contracted body member when released in the cylinder expanding into true cylindrical form in tight engagement with the cylinder walls by the resiliency of the body member metal whereby the original open cleft gap is partially reclaimed.

3. An elongated liner sleeve for cylinder comprising an end-flanged cylindrically shaped thin walled body member formed of nitrided resilient sheet metal steel of uniform thickness and having a straight open cleft throughout its length formed by the spaced faces on adjacent edges of said sheet metal, said spaced faces being arranged in angular relation to the longitudinal axis of said liner, the circumferential length of the body member being less than the circumference of a selected cylinder to be lined therewith, said liner being contractible into abutment of the cleft defining faces to an outside diameter less than the diameter of the selected cylinder for free insertion into the cylinder, and said body member in a contracted state exerting an expanding force tending to reclaim its free state size.

4. A resilient thin walled cleft cylinder liner arranged for free insertion in a cylinder without press fitting which comprises a generally cylindrical cleft body member of resilient hardened metal having a circumferential length less than the circumference of the cylinder to be lined therewith and spaced radially aligned end faces, said body member being sized for assuming a true cylindrical shape when the cleft gap therein lies between fully contracted and fully expanded positions of the body member, said body member in its true cylindrical shape being resiliently expansible and tending to reclaim the cleft gap in its uncontracted shape, and marking indicia on the body member indicating the inside and outside diameters of the member in its true cylindrical shape whereby the liner can be contracted to close the cleft gap, be freely inserted in a cylinder having substantially the same diameter indicated on the body member, and expanded into firm engagement with the cylinder wall without uneven stressing of the body member.

5. A liner sleeve comprising a non-circular resilient cylindrical body member formed of hardened sheet metal having a straight cleft gap throughout its length formed by the spaced faces at the adjacent edges of said sheet metal, said body member being contractible to completely close said gap by abutment of said faces for relatively free insertion into a member to be lined therewith and being expansible into true circular form when seated in said member to form a straight cleft gap of less width than the original gap, and said liner in its seated position exerting an expanding force tending to reclaim the original cleft gap.

ARCHIE T. COLWELL.
HERBERT H. ENGEMANN.